United States Patent [19]

Riddersholm

[11] 4,218,165
[45] Aug. 19, 1980

[54] QUICK ACTION COLLET LOCK

[76] Inventor: Viggo M. Riddersholm, 2355 Clipper St., San Mateo, Calif. 94403

[21] Appl. No.: 963,478

[22] Filed: Nov. 24, 1978

[51] Int. Cl.² .................... B23C 1/00; B23D 31/20
[52] U.S. Cl. .................................. 409/225; 279/51
[58] Field of Search ............... 279/51, 50, 46 R, 54; 409/219, 225

[56] References Cited

U.S. PATENT DOCUMENTS

| | | | |
|---|---|---|---|
| 2,401,071 | 5/1946 | Hillberg | 279/51 |
| 3,055,671 | 9/1962 | Lewis et al. | 279/51 |
| 3,542,385 | 11/1970 | Seitter | 279/51 |
| 3,746,853 | 7/1973 | Allen | 279/51 |

FOREIGN PATENT DOCUMENTS

| | | | |
|---|---|---|---|
| 2242196 | 5/1975 | France | 279/51 |
| 683981 | 12/1952 | United Kingdom | 279/51 |
| 1355886 | 6/1974 | United Kingdom | 279/51 |

Primary Examiner—William R. Briggs
Attorney, Agent, or Firm—Townsend and Townsend

[57] ABSTRACT

An improved chuck for opening and closing a split collet into which a work piece is inserted. The collet is inserted into a central bore in the chuck housing and a threaded end of the collet is threaded into a rotatable annular member located in a counterbore in the rear of the chuck housing. The rotatable annular member has forwardly directed cam surfaces which cooperate with rearwardly directed cam surfaces in the chuck housing. A recess provided in the radially outer surface of the annular member is aligned with a radial bore in the rear of the chuck housing. A cylindrical key rotatable within the radial bore has an eccentric shaft protuding into the recess in the outer surface of the annular member. Turning the key within the radial bore moves the eccentric shaft into contact with a wall of the recess and rotationally biases the annular member. As the annular member is rotated its cam surfaces ride up respective cam surfaces in the chuck housing, thereby displacing the annular member and the collet rearwardly. Rearward displacement of the collet within the chuck forces the split end of the collet against the front of the chuck housing so as to securely hold the work piece.

17 Claims, 6 Drawing Figures

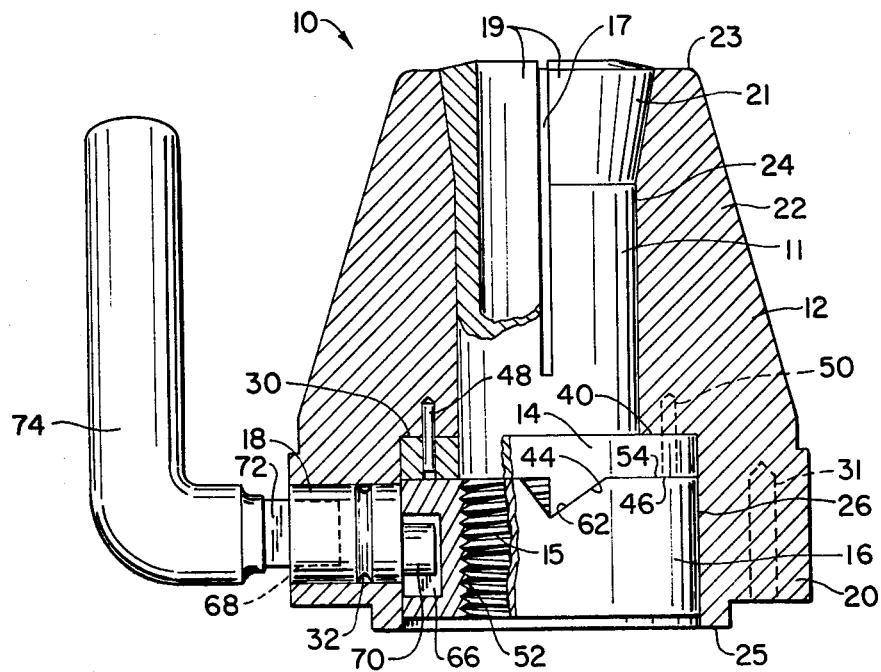
FIG._1A.
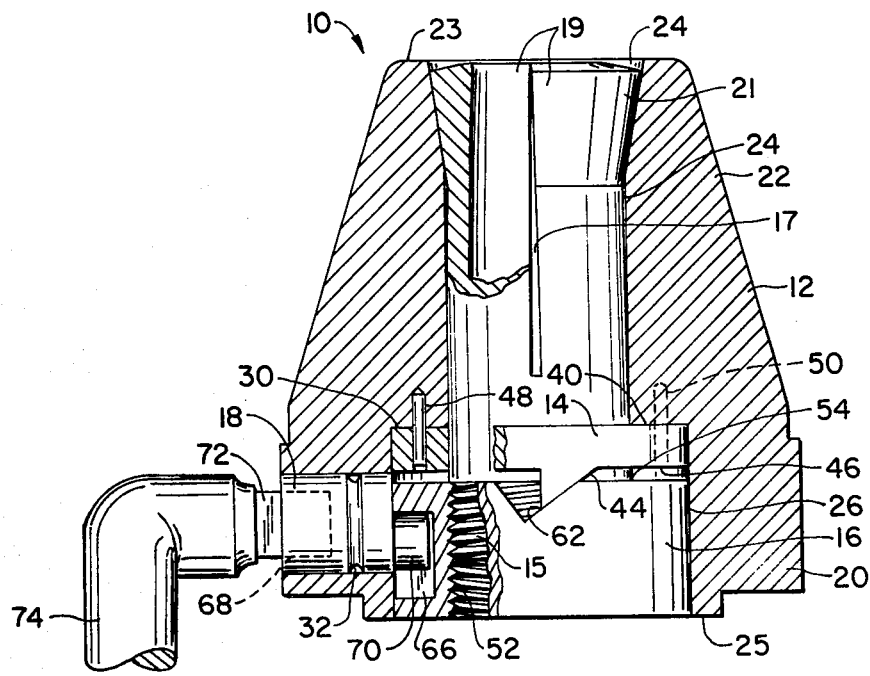
FIG._1B.

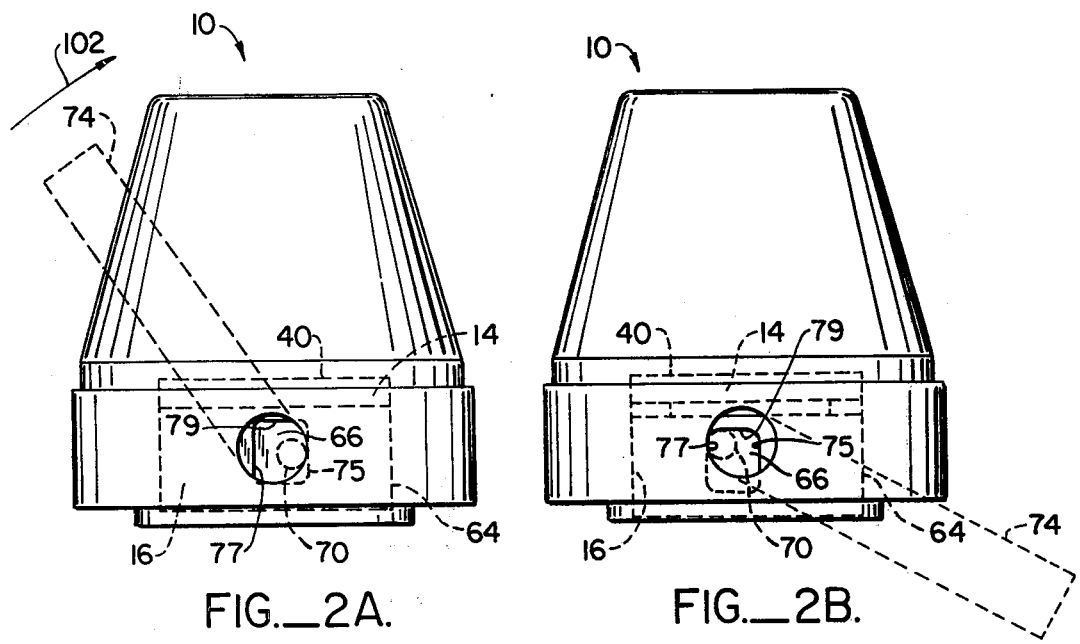
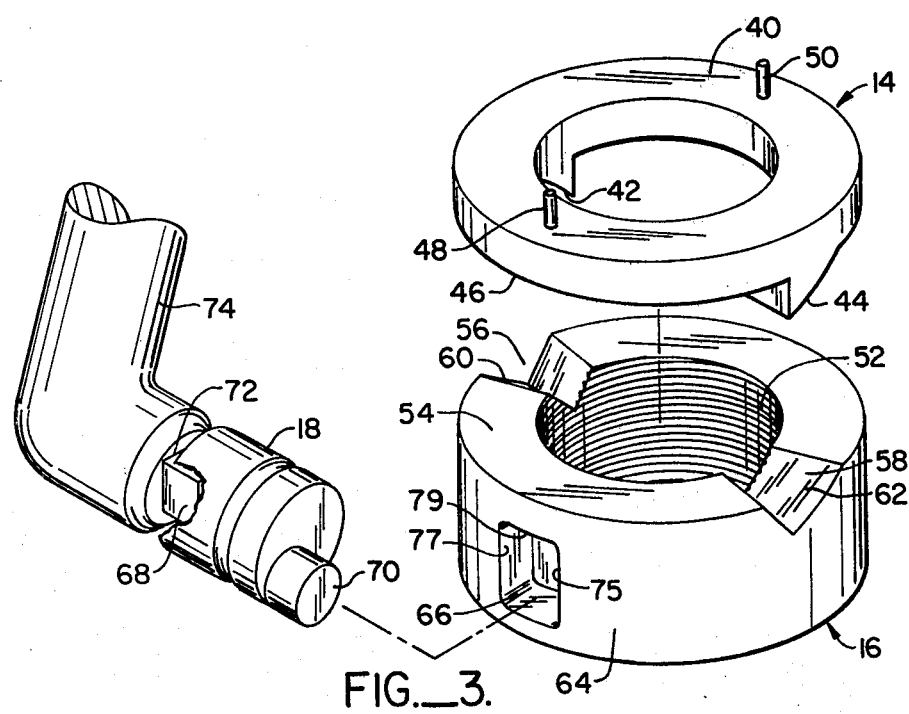

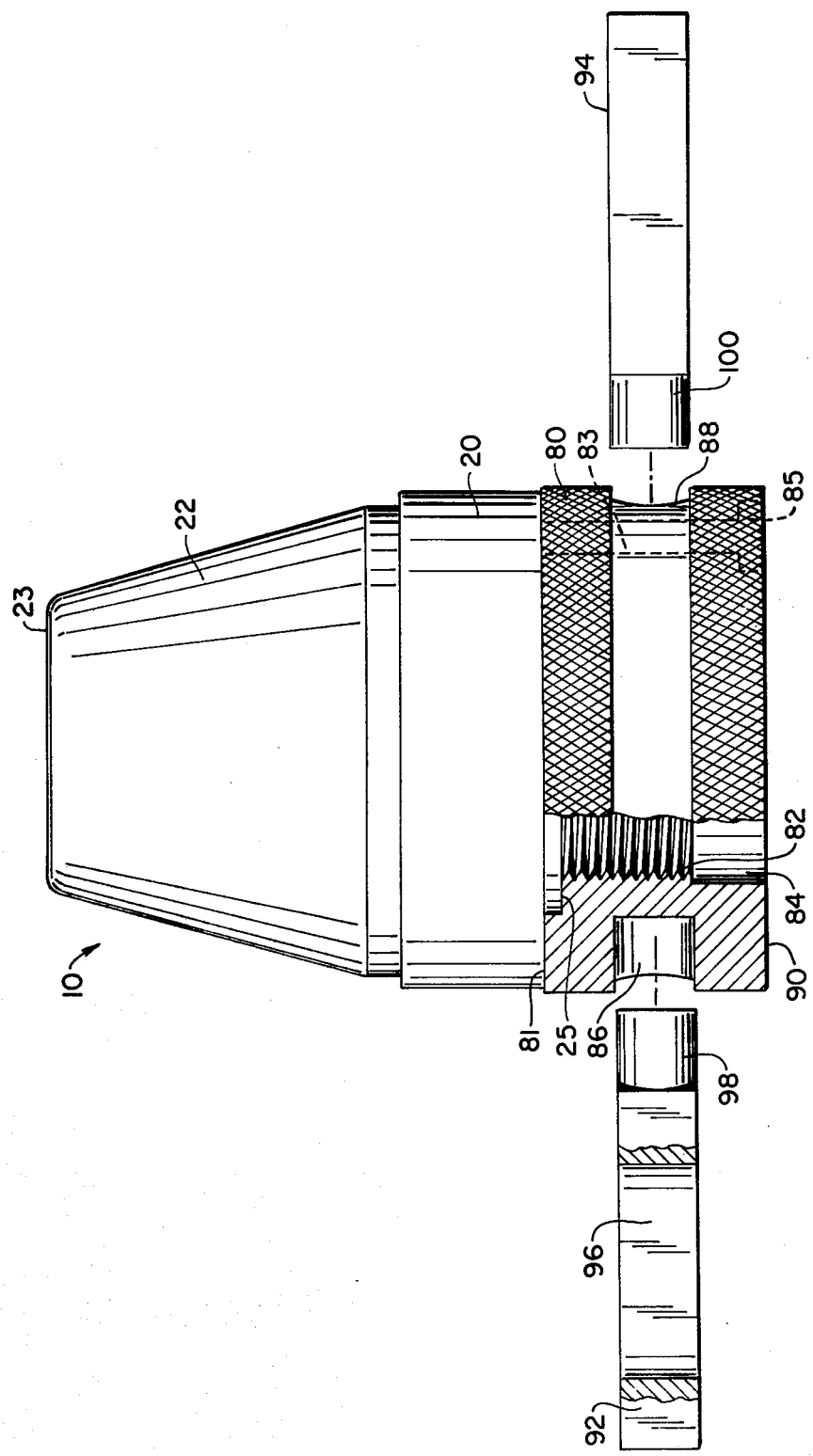
FIG._4.

QUICK ACTION COLLET LOCK

BACKGROUND OF THE INVENTION

This invention relates to devices for holding work pieces during machining, and more specifically to a chuck for opening and closing the leaves on the end of a split collet which centers and holds the work piece to be machined.

In certain machining operations, such as those utilizing a lathe having a hollow spindle, a split collet held by a chuck is used to securely grasp the work piece. In conventional practice, a draw tube inserted into one end of the hollow spindle is connected to an end of the split collet. The draw tube is pulled rearward to force the split end of the collet against the chuck so as to bias the leaves of the collet together, thereby centering and securing the work piece. Typically, the draw tube is pulled rearward by either a hand wheel or a lever located near the end of the hollow spindle. In order to release the work piece after machining, the draw tube is moved forward to move the leaves on the split end of the collet away from the chuck, thereby loosening the work piece within the collet The draw tube type of collet closing devices are cumbersome and, since the hand wheel or lever is located some distance from the work piece, the machinist must move to the end of the lathe to open or close the collet. Additionally, such devices are not capable for use on machines other then lathes, such as vertical milling machines.

U.S. Letters Pat. No. 3,055,671 discloses a quick-release collet closing device. This patent discloses a spring-biased split ring having grooves on its radially inner surface. The forward face of the ring has cams which are adapted to contact rearwardly oriented cams on the back of the chuck. The angular movement of a lever arm projecting radially outwardly from the chuck and connected to the split ring simultaneously forces the ring halves together to grip the end of the collet and causes the cam surfaces on the ring to contact the cam surfaces on the chuck, thereby displacing the collet rearwardly, forcing the leaves on the split end of the collet against the chuck, and biasing the leaves together to grip the work piece.

This type of chuck has inadequate provision for locking the collet in either the open or the closed position. Thus when the work piece is inserted into the open collet, The collet must be held in the chuck to prevent the end of the collet from moving out of alignment with the split ring. When the collet is closed about the work piece, the only forces acting to keep the collet closed are axial forces generated by the opposing cam surfaces. The split ring is not locked from rotating so that any disturbing torques generated by the machining operation may cause the split ring to rotate, the ring halves to separate, and the collet and work piece to become loose in the chuck. Additionally, this type of chuck will not accept collets having threaded ends and is complicated to operate in that it requires a first angular movement of the lever arm to grip the collet and a further angular movement to engage the cam surfaces on the ring with those on the chuck.

SUMMARY OF THE INVENTION

The present invention provides a chuck which quickly and simply opens and closes collets having threaded ends and which securely locks the collet in both the open and closed positions.

In general, the invention is an improved chuck which comprises a housing having forward and rearward portions, a central bore therethrough for receipt of the collet, a counterbore in the rearward portion, and a radially directed bore in the rearward portion which provides communication from the counterbore in the housing to the housing exterior; rearwardly directed cam surfaces within the housing; means having forwardly directed cam surfaces and rotatable within the counterbore for engaging an end of the collet; and means insertable from the exterior of the housing through the radial bore which contacts the collet end engaging means and rotationally biases it to cause the cam surfaces on the collet end engaging means to ride up the cam surfaces in the housing.

The forward and rearward portions of the housing are respectively generally conically and cylindrically shaped. The central bore located through the central axis of the housing is of constant diameter except at the forward end, where it diverges radially outward. A counterbore is located in the cylindrically shaped rearward portion and is centered about the axis of the central bore. The termination of the counterbore within the housing defines a rearwardly directed annular face. A radially directed bore in the rearward portion of the housing provides communication from the counterbore to the housing exterior.

A ring is secured to the annular face in the housing and has cam surfaces projecting rearwardly therefrom.

The rotatable member disposed within the counterbore comprises generally an annular member having an outer diameter generally equal to that of the counterbore, a forward face having cam surfaces thereon which cooperate with the cam surfaces of the ring, and a rectangularly shaped recess in its radially outermost surface. The annular member has its radially inner surface threaded for engagement with a threaded end of the collet. When the collet is threaded into the annular member and the annular member rotated, the cam surfaces of the annular member ride up on those of the ring to displace the annular member and the collet rearward, thereby closing the collet leaves about the work piece.

The means for rotationally biasing the annular member located within the counterbore so as to cause the cam surfaces on the annular member to ride up on the cam surfaces projecting rearwardly from the ring comprises generally a key rotatable within the radial bore and having an eccentric shaft protruding radially inwardly and into the recess in the annular member. The eccentric shaft contacts opposing walls in the recess to prevent rotation of the annular member and to thus securely lock the collet in either the open or closed position.

Also provided with the present invention is an adapter for attaching the apparatus to the hollow spindle of a lathe. Means are also provided for securing the chuck to the horizontal work table of a vertical milling machine if the work piece is to be supported vertically for machining in that manner.

In order to center and hold the work piece within the collet, the key inserted in the radial bore is turned to cause movement of the eccentric shaft protruding into the recess on the outer surface of the annular member. The eccentric shaft contacts a wall of the recess and rotationally biases the annular member within the counterbore. The relatively slight rotational movement effected by the eccentric shaft causes the cam surfaces on the forward face of the annular member to ride up on the cam surfaces projecting rearwardly from the ring secured to the annular face in the housing, thereby causing the annular member and therewith the collet to be displaced rearwardly within the housing. In this manner, the leaves on the split end of the collet are pulled rearward and biased toward one another by the forward end of the housing. The work piece is thereby centered and secured by the leaves on the split end of the collet.

After the key has been turned, generally only about a half turn, the eccentric shaft remains in contact with a wall of the rectangularly shaped recess so that further movement of the annular member and therewith the collet is prevented, thereby locking the collet into the closed position about the work piece.

When it is desired to open the collet and release the work piece, the key is turned in the opposite direction so that the eccentric shaft moves away from the previously contacted wall of the rectangular recess and into contact with an opposite wall, thereby causing rotation of the annular member in the opposite direction within the counterbore. Rotation of the annular member in this direction causes the cam surfaces on the annular member to ride down on the cam surfaces projecting rearwardly from the ring secured to the annular face in the housing, thus moving the annular member forward and causing the leaves on the split end of the collet to be moved away from the forward portion of the housing so that the work piece may be removed from the open collet. Because the eccentric shaft remains in contact with the opposite wall and because the collet remains threaded into the annular member, the annular member is prevented from rotating and the collet leaves are locked open, thereby facilitating the removal of the work piece and the insertion of another work piece.

For a fuller understanding of the nature and advantages of the invention, reference should be made to the following detailed description taken in conjunction with the accompanying drawings.

BRIEF DESCRIPTION OF THE DRAWINGS

FIG. 1A is a sectional side view of the chuck, illustrating the collet in the open position.

FIG. 1B is a sectional side view of the chuck, illustrating the collet in the closed position.

FIG. 2A is a side view of the chuck, illustrating the position of the annular member and the key when the collet is in the open position.

FIG. 2B is a side view of the chuck, illustrating the position of the annular member and the key when the collet is in the closed position.

FIG. 3 is an exploded isometric view of certain components of the chuck.

FIG. 4 is a side view illustrating the chuck secured to an adapter and means for attaching the adapter to a vertical milling machine.

DESCRIPTION OF THE PREFERRED EMBODIMENTS

Referring first to FIGS. 1A and 1B, the chuck 10 for opening and closing a collet 11 comprises generally a housing 12 having a central bore 24 for receipt of the collet, a ring 14 secured to the housing, an annular member 16 within the housing and rotatable about the axis of central bore 24, and means, such as key 18, insertable from the housing exterior for contacting rotatable annular member 16.

Housing 12 of chuck 10 has a cylindrically shaped rearward portion 20 and a conically shaped forward portion 22. Central bore 24 is centered about the central axis of housing 12, extends from the front 23 of conical forward portion 22 to the back 25 of rearward portion 20, and has a substantially constant diameter except near the front 23 of housing 12, where it diverges slightly in a radially outward direction. Located in cylindrical rearward portion 20 is a counterbore 26, which is centered about the axis of central bore 24 and extends forward from back 25 so that its termination within housing 12 defines a rearwardly directed annular face 30. A radial bore 32 in rearward portion 20 of housing 12 is oriented perpendicular to the axis of central bore 24 and counterbore 26 and provides communication from the housing exterior into counterbore 26. Also located within rearward portion 20 and extending forward are a plurality of axially directed threaded bores, such as bore 31.

Secured to the rearwardly directed annular face 30 of housing 12 is a ring 14. Ring 14 has an outer diameter generally equal to the diameter of conterbore 26 and an inner diameter generally equal to the diameter of central bore 24. Ring 14 has cam surfaces 42, 44 (FIG. 3) projecting rearwardly from its rear surface 46. Ring 14 is secured to annular face 30 and prevented from rotation within couterbore 26 by means of pins 48, 50.

Referring to FIGS. 1A, 1B, and 3, annular member 16 located in counterbore 26 and rotatable therein has an outer diameter generally equal to the diameter of counterbore 26 and an inner diameter generally equal to the diameter of central bore 24. The inner surface 52 of annular member 16 is threaded for engagement with the threaded end 15 of collet 11. Annular member 16 has a front face 54 from which cutouts 56, 58 depend rearwardly. Cutouts 56, 58 are configured generally as V-shaped notches and thereby define planar cam surfaces 60, 62 respectively. Located in the radially outer surface 64 of annular member 16 and projecting radially inwardly therefrom is a rectangularly shaped recess 66. As illustrated in FIG. 1A, when annular member 16 is located within counterbore 26 so that cam surfaces 42, 44 projecting rearwardly from ring 14 are located generally within respective cutouts 56, 58, rectangular recess 66 is in alignment with radial bore 32 in rearward portion 20.

A key 18 having a diameter generally equal to the diameter of radial bore 32 is rotatable within radial bore 32 and has an eccentric shaft 70 protruding inward beyond the extent of radial bore 32 and into recess 66 in annular member 16. Key 18 has a socket 68 (FIG. 3) for engagement by the head 72 of wrench 74. The socket 68 on key 18 is preferably shaped to accommodate a conventionally sized Allen head wrench which is quickly inserted and removed from the socket. As better illustrated in FIG. 3, eccentric shaft 70 protrudes from key 18 so that during rotation of key 18 within radial bore 32, the outermost edge of shaft 70 circumscribes a circle of diameter generally equal to the diameter of key 18 and radial bore 32.

Collet 11 has a generally tubular shape and an outer diameter slightly less than the diameter of central bore 24 to permit a relatively tight fit in central bore 24. A plurality of longitudinal slots, such as slot 17, define collet leaves 19 which diverge outwardly at the split end 21 so as to be accommodated within the outwardly diverging portion of central bore 24.

An adapter 80, as shown in FIG. 4, is normally provided to attach chuck 10 to a cutting machine, such as a lathe or a machine having a horizontal work table, e.g. a vertical milling machine. Adapter 80 has a generally annular shape and a front surface 81 for mating with the rearward portion 20 of housing 12. A plurality of axially directed bores, such as bore 83, each of which has an associated counterbore, such as counterbore 85, is provided. The axial bores on adapter 80 are aligned with the threaded bores, such as bore 31, on rearward portion 20 of housing 12. Bolts, (not shown) are placed through each of the axially aligned bores in the adapter and into threaded engagement with the threaded bores in rearward portion 20 of housing 12, thereby securing adapter 80 to chuck 10. The radially inner surface 82 of adapter 80 is threaded for engagement with a hollow spindle (not shown) on a lathe (not shown). The central opening 84 in adapter 80 permits the insertion of the work piece, e.g. bar stock, from the rear of the hollow spindle, through opening 84 and collet 11.

Adapter 80 is also provided with a pair of radially oriented counterbores 86, 88 and has a planar rear face 90. When chuck 10 secured to adapter 80 is connected to the hollow spindle of a lathe, the axis of central bore 24 is oriented generally horizontally. However, if it is desired to hold a work piece on a vertical milling machine (not shown), chuck 10 and adapter 80 secured thereto are oriented so that the axis of central bore 24 is oriented vertically. Referring to FIG. 4, two brackets 92, 94 are provided. A typical bracket 92 has a longitudinal slot 96 and a cylindrical end 98. Cylindrical ends 98, 100 of brackets 92, 94 are inserted into respective counterbores, 86, 88 on adapter 80. Bolts (not shown) are placed vertically through slots, such as slot 96, and into openings (not shown) in the horizontal work table (not shown) of the vertical milling machine, thereby securing brackets 92, 94 and therewith adapter 80 to the work table so that rear face 90 of adapter 80 is in secure contact with the work table.

The features and component parts of the above described chuck 10 and adapter 80 may be better understood by considering the operation of chuck 10 to open and close collet 11 so as to release or hold a work piece to be machined.

FIGS. 1A and 2A illustrate the position of annular member 16 relative to ring 14 when collet 11 is in the open position. Collet 11 is inserted into central bore 24 and its threaded end 15 is threaded into engagement with the threaded inner surface 52 of annular member 16. As previously described, because ring 14 has an inner diameter generally equal to the diameter of central bore 24, collet 11 is readily inserted past ring 14 for threaded engagement with annular member 16. As illustrated in FIG. 1A, the leaves 19 at the split end 21 of collet 11 are spread apart and in relatively loose engagement with the diverging portion of central bore 24. It should be noted that when collet 11 is in the open position depicted in FIG. 1A, front face 54 of annular member 16 is in contact with rear surface 46 of ring 14 and cam surfaces 42, 44 projecting rearwardly from ring 14 are disposed within cutouts 56, 58 in annular member 16. Cam surface 42 is in contact with cam surface 60 of annular member 16 and cam surface 44 is in contact with cam surface 58 of annular member 62 (FIG. 3). When annular member 16 is in this forwardmost posotion in counterbore 26 and is in contact with ring 14, eccentric shaft 70 of key 18 is in the position depicted in FIG. 2A, i.e., in contact with wall 75 of recess 66 in annular member 16.

Referring to FIG. 2A, it should be noted that because annular member 16 is in its forwardmost position so that its front face 54 is in contact with rear face 46 on ring 14 and because shaft 70 is contacting wall 75 in recess 66, any movement of annular member 16 within counterbore 26 is prevented, thereby facilitating the threading of collet end 15 into annular member 16 and preventing any premature closing of collet leaves 19. Preferably shaft 70 contacts wall 75 along a line such that the plane defined by the line of contact and the axis of radial bore 32 is perpendicular to the axis of central bore 24, i.e. generally as shown in FIG. 2A. However, even if shaft 70 contacts wall 75 at a position slightly offset from the preferred line of contact, key 18 still prevents any rotation of annular member 16 since any forces applied to shaft 70 tending to rotate key 18 within radial bore 32 would be applied through a relatively small moment arm. Thus collet 11 is locked in the open position to permit the easy insertion of the work piece.

After collet 11 has been threaded into engagement with annular member 16, the work piece to be machined may be inserted through the open leaves 19. If chuck 10 is secured to adapter 80 (FIG. 4) and connected to the hollow spindle of a lathe, the work piece, e.g. bar stock, is inserted from the end of the lathe through the hollow spindle, through opening 84 in adapter 80, through collet 11 and past the open leaves 19. The work piece is thus only loosely retained within collet 11 and must be securely held in collet 11 before it can be machined.

Referring to FIGS. 1B and 2B, the position of annular member 16 and eccentric shaft 70 of key 18 is illustrated when the leaves 19 of collet 11 are closed and the work piece is securely held. In order to achieve this position of annular member 16, i.e. its axial displacement rearward from ring 14, wrench 74 engaged with the socket 68 of key 18 is turned in the direction indicated by arrow 102, i.e. from the position shown in FIG. 2A to the position shown in FIG. 2B. As illustrated, eccentric shaft 70, which is caused to move within recess 66 by the turning of key 18 in radial bore 32, is moved away from wall 75 in recess 66 and into contact with opposite wall 77. As shaft end 70 contacts wall 77, annular member 16 is rotationally biased a relatively slight amount. This slight rotational movement of annular member 16 results in an axial displacement of annular member 16, and therewith collet 11 in central bore 24. This axial displacement of annular member 16 is caused by cam surfaces 60, 62 on annular member 16 riding up on respective cam surfaces 42, 44 on ring 14. Thus approximately only a half turn of wrench 74 causes eccentric shaft 70 to move from contact with wall 75 to contact with opposite wall 77 in recess 66 and to ultimately displace annular member 16 and collet 11 axially rearward to the position illustrated in FIG. 1B. As collet 11 is forced rearward within chuck 10, leaves 19 at the split end 21 of collet 11 are biased together by forward portion 22 of housing 12. The leaves 19 biased together thereby grip and securely hold the work piece to be machined.

It should be especially noted, by referring to FIGS. 1B and 2B, that annular member 16 and collet 11 are locked into this closed or axially displaced position because shaft 70 contacts wall 77 in recess 66. Shaft 70 contacts wall 77 along a line which, together with the axis of radial bore 32, defines a plane perpendicular to the axis of central bore 24. Thus, in a similar manner as discussed above for the open or unlocked position of collet 11, any forces applied to shaft 70 by wall 77, as might occur during machining, do not cause rotation of shaft 70 within radial bore 32. However, even if the line of contact of shaft 70 with wall 77 is slightly away from the preferred position, movement of annular member 16 is still prevented because of the relatively small moment arm through which the forces would be acting. As illustrated in FIG. 2B, forward wall 79 of recess 66 is also in contact with shaft 70 when collet 11 is in the locked position. As should be apparent further rotation of key 18 in the direction of arrow 102 is prevented when shaft 70 contacts forward wall 79. The size of rectangular recess 66 and radial bore 32 is preferably chosen so that rotation of key 18 stops, i.e. shaft 70 contacts forward wall 79 and collet 11 locks, when the line of contact of shaft 70 with wall 77 is at the above-described preferred position. Annular member 16 is thus prevented from rotating, and collet 11 is locked about the work piece in the event any disturbing torques are applied to the work piece during machining.

When collet 11 is in a closed or locked position, the planar shape of cam surfaces 60, 62 and cam surfaces 42, 44 which are in respective contact with one another, together with the close fit of annular member 16 in counterbore 26, securely lock annular member 16 in the axially displaced position.

The opening of collet 11 from the closed or locked position illustrated in FIGS. 1B and 2B is accomplished by turning wrench 74 back from the position illustrated in FIG. 2B to the position illustrated in FIG. 2A, thereby moving annular member 16 forward into contact with ring 14 and opening leaves 19 of collet 11.

As should now be apparent, the present invention provides a chuck which accommodates collets having threaded ends and which permits rapid opening and closing of the collet leaves by simple rotation of a key located in the chuck itself. The key not only opens and closes the collet but also locks the collet in both the open and closed positions. Thus the collet need not be held when the work piece is inserted. Because the collet and the annular member into which it is threaded are prevented from rotating, the collet will not inadvertently open during machining. Additionally, because the locking device is located within the chuck, the chuck is easily adapted for connection to a vertical milling machine, which is not possible with chucks utilizing conventional draw tubes to open and close the collet leaves.

While the preferred embodiment of the present invention has been illustrated in detail, it should be apparent that modifications and adaptations to that embodiment will occur to those skilled in the art. However, it is to be expressly understood that such modifications and adaptations are within the sphere and scope of the present invention as set forth in the following claims.

What is claimed is:

1. An apparatus for holding a work piece to be machined comprising:
   a generally tubular shaped collet having an inner surface for gripping the work piece, a first end, and a second end, said first end having a plurality of bendable leaves diverging radially outwardly therefrom;
   a housing having forward and rearward portions, a central bore therethrough for receipt of the collet, a counterbore in the rearward portion defining a rearwardly directed face, and a radial bore oriented generally perpendicular to the axis of said counterbore and providing communication from said counterbore to the housing exterior;
   means on said rearwardly directed face defining cam surfaces;
   means loosely disposed within said counterbore for engaging the second end of the collet, said second end engaging means having a radially directed recess in its radially outermost surface and a forward face having cam surfaces thereon; and
   means insertable through, and rotatable within, said radial bore and into said recess for effecting relatively slight rotational movement of said second end engaging means generally about the axis of said counterbore, said recess having a wall oriented generally parallel to the axis of said central bore, said rotational movement means having an eccentric shaft protruding into said recess, whereby during movement of said eccentric shaft, said shaft contacts said wall and rotationally biases said second end engaging means so that the cam surfaces thereon ride up on the cam surfaces on said rearwardly directed face and said second end engaging means and therewith the collet is displaced rearward to hold the work piece.

2. An apparatus according to claim 1 wherein said means on said rearwardly directed face further comprises a ring having cam surfaces projecting rearwardly therefrom, and means for securing said ring to said housing so as to prevent rotational movement of said ring.

3. An apparatus according to claim 2 wherein said second end engaging means further comprises an annular member having a forward face and cutouts extending rearwardly from said forward face and defining cam surfaces, whereby when the collet is in its forwardmost position the forward face of said annular member contacts said ring and the rearwardly projecting cam surfaces on said ring are disposed within the cutouts on said annular member.

4. An apparatus according to claim 3 wherein the cam surfaces on said ring and the cam surfaces defined by the cutouts on said annular member are generally planar in shape so as to provide a relatively large contact area between respective cam surfaces.

5. An apparatus according to claim 1 wherein said recess has a second wall oriented generally perpendicular to the axis of said central bore for contacting said eccentric shaft and stopping movement of said shaft at a position such that said shaft locks said second end engaging means.

6. An apparatus according to claim 1 wherein the second end of the collet is threaded and wherein said second end engaging means further comprises an annular member having its radially inner surface threaded for receipt of the threaded second end of the collet.

7. An apparatus according to claim 1 wherein the apparatus is adapted for machining the work piece on a lathe having a hollow spindle, and including means for attaching said housing proximate its rearward portion to the lathe spindle.

8. An apparatus according to claim 7 wherein said attaching means further comprises an annular adapter having its radially inner surface threaded for engagement with a portion of the lathe spindle, and means for securing said adapter to said housing.

9. An apparatus according to claim 1 wherein the apparatus is adapted for machining the work piece on a vertical milling machine having a horizontal work table, and including means for connecting said housing to the work table of the vertical milling machine.

10. An apparatus according to claim 9 wherein said connecting means further comprises an annular adapter, means for securing said adapter to said housing, and means for securing said adapter and therewith said housing to the work table.

11. An apparatus for holding a work piece to be machined comprising:
- a generally tubular shaped collet having an inner surface for gripping the work piece, a first end, and a second end, said first end having a plurality of bendable leaves diverging radially outwardly therefrom;
- a housing having forward and rearward portions, a central bore therethrough for receipt of the collet, a counterbore in the rearward portion defining a rearwardly directed face, and a radial bore oriented generally perpendicular to the axis of said counterbore and providing communication from said counterbore to the housing exterior;
- means on said rearwardly directed face defining cam surfaces;
- means loosely disposed within said counterbore for engaging the second end of the collet, said second end engaging means having a radially directed recess in its radially outermost surface and a forward face having cam surfaces thereon; and
- means insertable through, and rotatable within, said radial bore and into said recess for effecting relatively slight rotational movement of said second end engaging means generally about the axis of said counterbore, said recess having a second wall oriented generally perpendicular to the axis of said central bore, said rotational movement means having an eccentric shaft protruding into said recess, whereby during movement of said eccentric shaft said shaft contacts said second wall and said second wall stops movement of said shaft at a position such that said shaft locks said second end engaging means.

12. An apparatus for holding a work piece to be machined comprising in combination:
- a generally tubular shaped collet having an inner surface for gripping the work piece and an outer surface threaded at one end, said collet having a plurality of bendable leaves diverging radially outwardly at its other end;
- a housing having forward and rearward portions, a central bore therethrough for receipt of said collet, said central bore diverging outwardly at the forward end of said housing to accommodate said bendable leaves, a counterbore in its rearward portion defining a rearwardly directed face in said housing, and a radial bore providing communication from said counter bore to the housing exterior;
- means on said face defining cam surfaces;
- an annular member rotatably disposed within said counterbore and having fowardly directed cam surfaces for contacting the cam surfaces on said face, said annular member having a recess at its radially outermost surface, said recess being configured so as to have at least one wall oriented generally parallel to the axis of said central bore; and
- means rotatable within said radial bore and insertable into said recess for contacting said wall and for rotationally biasing said annular member, whereby the cam surfaces on said annular member ride up on the cam surfaces on said face, said annular member and therewith said collet is displaced rearwardly, and said bendable leaves of said collet are biased together at the forward end of said housing to securely hold the work piece to be machined.

13. An apparatus according to claim 12 wherein said recess has a second wall oriented generally perpendicular to the axis of said central bore for stopping the movement of said annular member biasing means at a position such that said annular member biasing means locks said annular member and therewith said collet.

14. An apparatus according to claim 12 wherein the apparatus is adapted for machining the work piece on a lathe having a hollow spindle, and including means for attaching said housing proximate its rearward portion to the lathe spindle.

15. An apparatus according to claim 14 wherein said attaching means further comprises an annular adapter having its radially inner surface threaded for engagement with a portion of the lathe spindle, and means for securing said adapter to said housing.

16. An apparatus according to claim 12 wherein the apparatus is adapted for machining the work piece on a vertical milling machine having a horizontal work table, and including means for connecting said housing to the work table of the vertical milling machine.

17. An apparatus according to claim 16 wherein said connecting means further comprises:
- an annular adapter;
- means for fastening said housing proximate its rearward portion to one end of said annular adapter; and
- means for securing the other end of said adapter to the table of the vertical milling machine, whereby said central bore of said housing is oriented generally vertically.

* * * * *